(12) United States Patent
Topcu et al.

(10) Patent No.: US 12,535,534 B2
(45) Date of Patent: Jan. 27, 2026

(54) BATTERY DATA COLLECTION FOR HEALTH OF BATTERY ANALYSIS

(71) Applicants: CPS Technology Holdings LLC, New York, NY (US); Clarios Germany GmbH & Co. KG., Hannover (DE)

(72) Inventors: Cagatay Topcu, Milwaukee, WI (US); Jeffrey R. Paynter, Colgate, WI (US); Markus Hoh, Wunstorf (DE); Dharmendra B. Patel, Menomonee Falls, WI (US); Chad Michael Steighner, Sussex, WI (US)

(73) Assignees: CPS Technology Holdings LLC, New York, NY (US); Clarios Germany GmbH & Co. KG, Hannover (DE)

( * ) Notice: Subject to any disclaimer, the term of this patent is extended or adjusted under 35 U.S.C. 154(b) by 190 days.

(21) Appl. No.: 18/292,088

(22) PCT Filed: Jul. 27, 2022

(86) PCT No.: PCT/US2022/038504
§ 371 (c)(1),
(2) Date: Jan. 25, 2024

(87) PCT Pub. No.: WO2023/009611
PCT Pub. Date: Feb. 2, 2023

(65) Prior Publication Data
US 2024/0345176 A1 Oct. 17, 2024

Related U.S. Application Data

(60) Provisional application No. 63/226,601, filed on Jul. 28, 2021.

(51) Int. Cl.
*G01R 31/392* (2019.01)
*G01R 31/396* (2019.01)
(Continued)

(52) U.S. Cl.
CPC ......... *G01R 31/396* (2019.01); *G01R 31/392* (2019.01); *H01M 10/425* (2013.01);
(Continued)

(58) Field of Classification Search
CPC ................ G01R 31/367; G01R 31/396; G01R 31/3865; H01M 2010/4278
(Continued)

(56) References Cited

U.S. PATENT DOCUMENTS

2013/0069661 A1* 3/2013 Rich ..................... H01M 10/42
324/433
2013/0134778 A1 5/2013 Tamanaha
(Continued)

FOREIGN PATENT DOCUMENTS

CN 114270418 A 4/2022
DE 102015115102 A1 3/2016
(Continued)

OTHER PUBLICATIONS

International Search Report and Written Opinion dated Jan. 23, 2023 for International Application No. PCT/US2022/038504 filed Jul. 27, 2022, consisting of 23 pages.
(Continued)

*Primary Examiner* — Giovanni Astacio-Oquendo
*Assistant Examiner* — Trung Q Nguyen
(74) *Attorney, Agent, or Firm* — Weisberg I.P. Law, P.A.

(57) ABSTRACT

A method, system, node and device are disclosed. A collector device configured to communicate with a vehicle system, a health node and at least one sensor is described. The collector device includes a communication interface configured to receive at least one measurement from the at least one sensor; and transmit battery data using at least one of a first communication link and a second communication link. The collector device further includes processing circuitry
(Continued)

configured to determine the battery data based at least in part on the received at least one measurement; and determine at least one of the first communication link and the second communication link for transmitting the battery data to the health node. The at least one of the first and second communication links is determined based at least in part on a usability of the second communication link to transmit the battery data.

20 Claims, 5 Drawing Sheets

(51) Int. Cl.
  *H01M 10/42* (2006.01)
  *H01M 10/48* (2006.01)
(52) U.S. Cl.
  CPC .... H01M 10/48 (2013.01); *H01M 2010/4278* (2013.01); *H01M 2220/20* (2013.01)
(58) Field of Classification Search
  USPC ...................... 324/500, 600, 76.11, 415–430
  See application file for complete search history.

(56) References Cited

U.S. PATENT DOCUMENTS

| | | | |
|---|---|---|---|
| 2013/0320988 A1* | 12/2013 | Feuchter | G01R 31/382 324/426 |
| 2014/0212714 A1* | 7/2014 | Butzmann | B60L 58/18 324/426 |
| 2019/0033377 A1 | 1/2019 | Karner et al. | |
| 2020/0099111 A1 | 3/2020 | Numata et al. | |
| 2020/0160622 A1 | 5/2020 | Aquila et al. | |
| 2020/0235442 A1 | 7/2020 | Yamashita et al. | |
| 2020/0284844 A1 | 9/2020 | Kawamoto et al. | |
| 2021/0049836 A1 | 2/2021 | Covington et al. | |

FOREIGN PATENT DOCUMENTS

| | | |
|---|---|---|
| JP | 2020135187 A | 8/2020 |
| WO | 2021053721 A1 | 3/2021 |

OTHER PUBLICATIONS

European Communication pursuant to Article 94(3) EPC dated Mar. 27, 2025 for Application No. 22754710.6, consisting of 6 pages.

* cited by examiner

BATTERY DATA COLLECTION FOR HEALTH OF BATTERY ANALYSIS

CROSS-REFERENCE TO RELATED APPLICATIONS

This application is a Submission Under 35 U.S.C. § 371 for U.S. National Stage Patent Application of International Application No.: PCT/US2022/038504, filed Jul. 27, 2022 entitled "BATTERY DATA COLLECTION FOR HEALTH OF BATTERY ANALYSIS," which claims priority to U.S. Provisional Application No.: 63/226,601, filed Jul. 28, 2021, entitled "BATTERY DATA COLLECTION FOR HEALTH OF BATTERY ANALYSIS," the entireties of both of which are incorporated herein by reference.

TECHNICAL FIELD

The present disclosure relates to data collection and analysis, and in particular, to battery sensor data collection for analyzing the health of a battery.

BACKGROUND

Energy storage such as storage of energy provided by batteries continues to be an important aspect of many industries, e.g., automotive industry, power generation industry, aerospace industry, etc. In the automotive industry example, vehicles use batteries to provide power for: engine starting in the case of vehicles that use internal combustion engines, driving electric motors in the case of electric vehicles, and accessories such as catalyst heaters. Monitoring battery health is important as, in many cases, the battery is the single power source for important functions. While some vehicle manufactures have designed vehicles to have some vehicle parameter monitoring (e.g., battery data monitoring, battery health information monitoring) that may be communicated to an on-board vehicle computer and/or a cloud network via a built-in wireless connection, these vehicles do not support add-on or after-market components (e.g., connectable to an on-board diagnostic (OBD) port) to retrieve certain monitored parameters and/or use the wireless connection built-in the vehicle. In other words, add-on or after-market components have little to no access to vehicle parameters (e.g., battery data, battery health information) and/or to the wireless communication system(s) of the vehicle.

SUMMARY

The present disclosure provides for a device, method and system for collecting and/or determining and/or transmitting/receiving vehicle parameters (e.g., battery data). In some embodiments, the data is collected using one or more sensors connectable to a battery. In some other embodiments, a collector device is used. The collector device may be connectable to the battery (e.g., via an OBD port) and/or the one or more sensors and/or to a communication link (and/or a network). In an embodiment, the sensor may be any one of: part of the battery, external to the battery/or the collector device, and part of the collector device. In another embodiment, the communication link may be the wireless connection of the vehicle and/or another wireless connection (e.g., a wireless connection associated with the vehicle user, a wireless connection of the collector device, etc.).

In some embodiments, the method provides piggy-backing sensor data, from at least one add-one sensor, on a vehicle's restricted communication systems, e.g., the vehicle's wireless communication system(s). Further, one or more embodiments described herein provide for analyzing and/or determining battery health of the vehicle based at least one the sensor data and weather information associated, for example, with the vehicle's location.

According to one aspect, a collector device configured to communicate with a vehicle system associated with a battery, a health node and at least one sensor is described. The collector device includes a communication interface configured to receive at least one measurement from the at least one sensor; and transmit battery data associated with the battery to the health node using at least one of a first communication link and a second communication link. The collector device further includes processing circuitry in communication with the communication interface, where the processing circuitry is configured to determine the battery data based at least in part on the received at least one measurement; and determine at least one of the first communication link and the second communication link for transmitting the battery data to the health node. The first communication link is associated with the collector device, and the second communication link is associated with the vehicle system. The at least one of the first and second communication links is determined based at least in part on a usability of the second communication link to transmit the battery data.

In some embodiments, the at least one sensor is connected to the battery to provide the at least one measurement, and the at least one sensor is any one of: external to at least one of the battery and the collector device; included in the battery; and included in the collector device.

In some other embodiments, the at least one sensor is a hybrid sensor being configured to provide the at least one measurement usable by the collector device and another measurement usable by the battery.

In an embodiment, the first communication link is associated with a first network, and the second communication link is associated with a second network. The second network is any one of restrictive and permissive for the collector device to communicate with the health node using the second communication link and the second network.

In another embodiment, the processing circuitry is further configured to determine the usability of the second communication link based on whether the second network is any one of restrictive and permissive.

In some embodiments, the processing circuitry is further configured to, when the second network is restrictive, modify at least one parameter associated with the second communication link at least to transmit the battery data to the health node using the second communication link and the modified at least one parameter.

In some other embodiments, the second network is restrictive when the vehicle system limits at least a set of the battery data to be transmitted using the second network.

In an embodiment, the determined battery data includes an identifier that causes the battery data to be routed through the second network when the battery data is transmitted.

In another embodiment, the communication interface is further configured to receive battery health information from the health node using at least one of the first and second communication links. The battery health information is based on the transmitted battery data.

In some embodiments, the collector device is configured to communicate with the vehicle system using an onboard diagnostic interface comprised in the vehicle system.

According to another aspect, a method in a collector device configured to communicate with a vehicle system associated with a battery, a health node and at least one sensor is described. The method includes receiving at least one measurement from the at least one sensor; determining battery data associated with the battery based at least in part on the received at least one measurement; determining at least one of a first communication link and a second communication link for transmitting the battery data to the health node, the first communication link being associated with the collector device, the second communication link being associated with the vehicle system, the at least one of the first and second communication links being determined based at least in part on a usability of the second communication link to transmit the battery data; and transmitting the battery data to the health node using at least one of the first communication link and the second communication link.

In some embodiments, the at least one sensor is connected to the battery to provide the at least one measurement, and the at least one sensor is any one of: external to at least one of the battery and the collector device; included in the battery; and included in the collector device.

In some other embodiments, the at least one sensor is a hybrid sensor being configured to provide the at least one measurement usable by the collector device and another measurement usable by the battery.

In an embodiment, the first communication link is associated with a first network, and the second communication link is associated with a second network. The second network is any one of restrictive and permissive for the collector device to communicate with the health node using the second communication link and the second network.

In another embodiment, the method further includes determining the usability of the second communication link based on whether the second network is any one of restrictive and permissive.

In some embodiments, the method further includes, when the second network is restrictive, modifying at least one parameter associated with the second communication link at least to transmit the battery data to the health node using the second communication link and the modified at least one parameter.

In some other embodiments, the second network is restrictive when the vehicle system limits at least a set of the battery data to be transmitted using the second network.

In an embodiment, the determined battery data includes an identifier that causes the battery data to be routed through the second network when the battery data is transmitted.

In another embodiment, the method further includes receiving battery health information from the health node using at least one of the first and second communication links. The battery health information is based on the transmitted battery data.

In some embodiments, the collector device is configured to communicate with the vehicle system using an onboard diagnostic interface comprised in the vehicle system.

According to one aspect, a health node configured to communicate with a collector device and a vehicle system associated with a battery is described. The health node includes a communication interface configured to receive, from the collector device, battery data associated with the battery using at least one of a first communication link associated with the collector device and a second communication link associated with the vehicle system. The health node also includes processing circuitry in communication with the communication interface, the processing circuitry being configured to perform a battery health analysis based at least in part on the received battery data.

In some embodiments, the first communication link is further associated with a first network, and the second communication link is further associated with a second network, the second network being any one of restrictive and permissive for health node to communicate with the collector device using the second communication link and the second network.

In some other embodiments, the processing circuitry is further configured to perform at least one measurement in at least one of the first network and the second network and identifying the battery data from the at least one measurement.

In an embodiment, the processing circuitry is further configured to extract the battery data from at least one of the first network and the second network.

In another embodiment, the battery health analysis is performed further based on weather data associated with a location of at least one of the collector device and the vehicle system.

In some embodiments, the communication interface is further configured to transmit, using at least one of the first communication link and the second communication link, battery health information based on the performed battery health analysis.

According to another aspect, a method in a health node configured to communicate with a collector device and a vehicle system associated with a battery is described. The method includes receiving, from the collector device, battery data associated with the battery using at least one of a first communication link associated with the collector device and a second communication link associated with the vehicle system; and performing a battery health analysis based at least in part on the received battery data.

In some embodiments, the first communication link is further associated with a first network, and the second communication link is further associated with a second network, the second network being any one of restrictive and permissive for health node to communicate with the collector device using the second communication link and the second network.

In some other embodiments, the method further includes performing at least one measurement in at least one of the first network and the second network and identifying the battery data from the at least one measurement.

In an embodiment, the method further includes extracting the battery data from at least one of the first network and the second network.

In another embodiment, the battery health analysis is performed further based on weather data associated with a location of at least one of the collector device 14 and the vehicle system.

In some embodiments, the method further includes transmitting, using at least one of the first communication link and the second communication link, battery health information based on the performed battery health analysis.

According to one aspect, a system is described. The system comprises a collector device, a vehicle system, and a health node. The collector device comprises a first communication interface configured to receive at least one measurement from at least one sensor; and transmit battery data associated with a battery to the health node using at least one of a first communication link and a second communication link. The collector device also includes first processing circuitry in communication with the first communication interface, the first processing circuitry being configured to determine the battery data based at least in part on the received at least one measurement; and determine at least one of the first communication link and the second communication link for transmitting the battery data to the health node. The first communication link is associated with the collector device, the second communication link is associated with the vehicle system. The at least one of the first and second communication links are determined based at least in part on a usability of the second communication link to transmit the battery data.

The vehicle system comprises a second communication interface configured to receive the battery data, from the collector device, using the second communication link; and transmit the battery data, to the health node, using the second communication link; receive battery health information, from the health node, using the second communication link; transmit the battery health information, to the collector device, using the second communication link.

The health node comprises a third communication interface configured to transmit, using at least one of the first communication link and the second communication link, the battery health information based on a battery health analysis.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
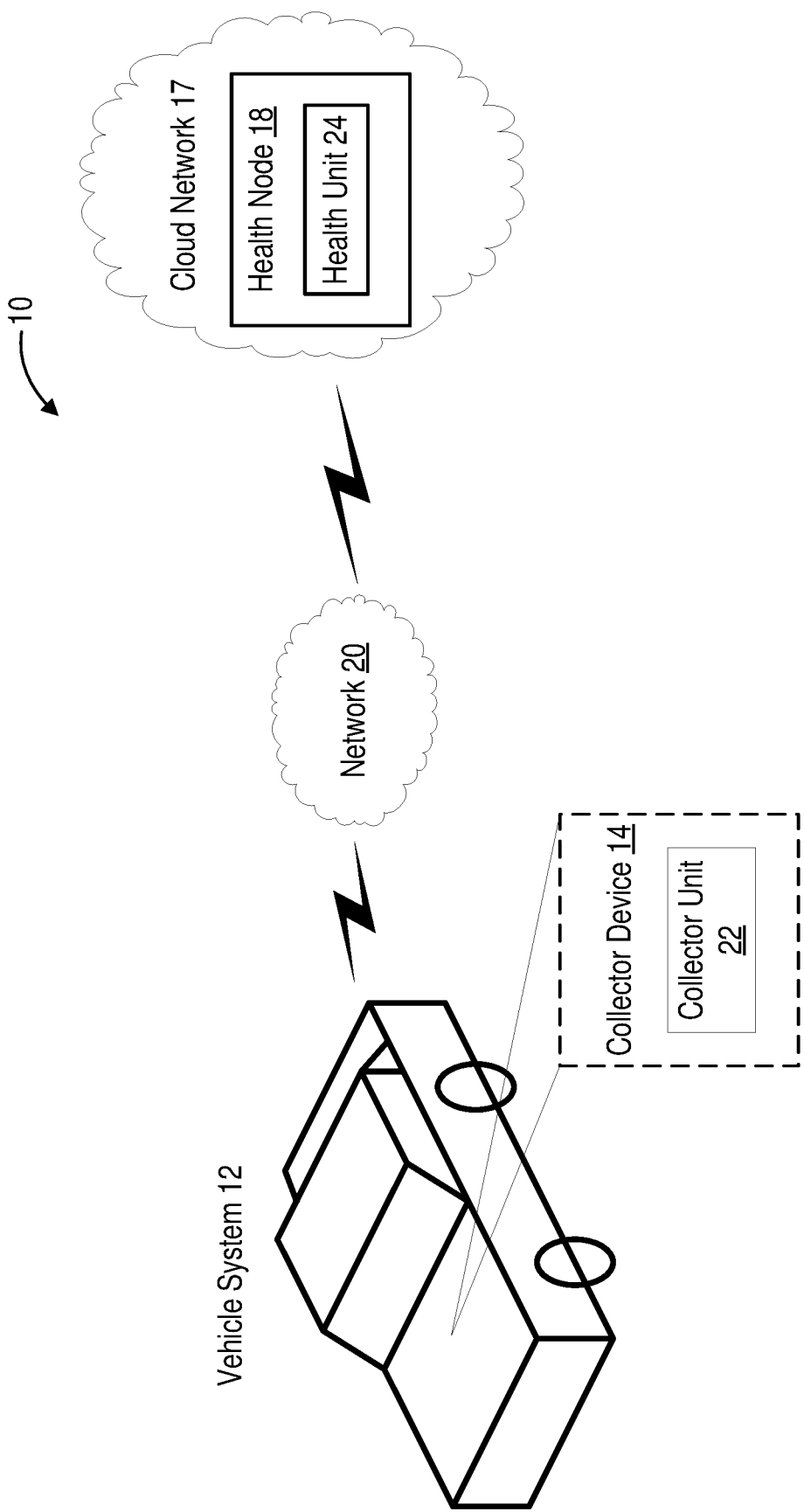
FIG. 1 is a diagram of an example system comprising a vehicle system according to principles disclosed herein.

Before describing in detail exemplary embodiments, it is noted that the embodiments reside primarily in combinations of apparatus components and processing steps related to battery data collection/determination/communication, e.g., for analyzing/providing the health of a battery. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring to the drawing figures, in which like elements are referred to by like reference numerals, there is shown in FIG. 1 a schematic diagram of a system 10 according to an embodiment of the present invention. System 10 includes vehicle system 12 that may include an at least one collector device 14 (e.g., add-on collector device) for processing battery data as described herein. In one or more embodiments, collector device 14 includes a sensor that is in communication with the battery (e.g., communication with at least one terminal such as a positive terminal of the battery, direct/indirect communication, etc.) for performing one or more measurements such as, but not limited to, battery/cell voltage and/or current draw measurement, battery temperature, power load, etc. System 10 may also include cloud network 17. Cloud network 17 includes one or more nodes or servers such as health node 18 that is configured to identify and extract measurement data, e.g., from collector device 14, in a network such as the vehicle manufacturer and/or battery manufacture's network, and/or analyze the measurement data in conjunction with other factors, e.g., weather data to analyze battery health, as described herein. Health node 18 is not limited to being in cloud network 17 and may be part of and/or included in and/or use other networks.

Further, system 10 may include one or more networks 20 (e.g., network 20a, network 20b, network 20c, etc.) which may be configured to provide communication, e.g., wired and/or wireless communication, between vehicle system 12 and cloud network 17 such as to the manufacture's node (not shown) in the cloud network 17. In particular, network 20 may be a cellular based network/link ($4^{th}$ Generation/Long Term Evolution (LTE), $5^{th}$ Generation/New Radio (NR)), low energy wireless network (e.g., BLUETOOTH network), or other network/link and/or be preconfigured for use by vehicle system 12 such that vehicle system 12 may control access to network 20. However, network 20 is not limited as such and may include one or more networks, which may be any kind of network. Of note, "manufacturer" when used generally herein may refer to the vehicle manufacturer and/or the vehicle battery manufacturer and/or battery service provider.

Collector device 14 may include collector unit 22 that is configured to perform any step and/or task and/or process and/or method and/or feature described in the present disclosure, e.g., perform one or more collector device 14 functions described herein such as with respect to battery data collection and reporting. Health node 18 may include health unit 24 that is configured to perform any step and/or task and/or process and/or method and/or feature described in the present disclosure, e.g., perform one or more health unit 24 functions as described herein such as with respect to battery data identification and analysis.

Example implementations, in accordance with an embodiment, of the vehicle system 12, collector device 14 and health node 18 discussed in the preceding paragraphs will now be described with reference to FIG. 2.

Vehicle system 12 may include hardware 26 that may include one or more communication interfaces 27 for communicating with one or more of collector device 14, cloud network via one or more of wired and wireless connections. In one nonlimiting example, communication interface 27 is configured to communicate using one or more communication links 72, 74. In another nonlimiting example, communication interface 27 may be an on-board diagnostic (OBD) interface. The hardware 26 may include processing circuitry 28. The processing circuitry 28 may include a processor 30 and a memory 32. In particular, in addition to or instead of a processor, such as a central processing unit, and memory, the processing circuitry 28 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 30 may be configured to access (e.g., write to and/or read from) the memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 32 may be configured as a storage device.

Vehicle system 12 may further have software 34 stored internally in, for example, memory 32, or stored in external memory (e.g., database, storage array, network storage device, etc.) accessible by the vehicle system 12 via an external connection. The software 34 may be executable by the processing circuitry 28.

The processing circuitry 28 may be configured to control any of methods and/or processes described herein and/or to cause such methods, and/or processes to be performed, e.g., by vehicle system 12. Processor 30 corresponds to one or more processors 30 for performing vehicle system 12 functions described herein. In some embodiments, the software 34 may include instructions that, when executed by the processor 30 and/or processing circuitry 28, causes the processor 30 and/or processing circuitry 28 to perform the processes described herein with respect to vehicle system 12.

System 10 includes collector device 14. In one or more embodiments, collector device 14 may be a dongle. The dongle may be arranged to couple to the vehicle's data system by being removably couplable to the vehicle's OBD interface, e.g., communication interface 27. Collector device 14 includes hardware 36 that may include one or more communication interfaces 38 for communicating with vehicle system 12, e.g., via communication link 74. For example, communication interface 38 may be configured to communicate via the OBD interface of the vehicle and/or another interface. Communication interface 38 may also be configured to communicate with other devices, e.g., health node 18, using communication link 70. The hardware 36 may include one or more sensors 40 for obtaining and/or performing one or more measurements such as battery measurements. The measurement may be performed a predefined intervals. For example, measurements may include voltage, current, etc., as described above, and may be taken at configurable frequency. Sensor 40 may be comprised in collector device or external to collector device such as integrated with vehicle system 12 and/or with a battery associated with the vehicle system 12 or standalone. In one or more embodiments, sensor 40 is configured to communicate with one or more devices (such as any device comprised in system 10). In an embodiment, sensor 40 may be a hybrid sensor such as a sensor that provides one or more measurements/functions. For example, a hybrid sensor may be a sensor that is integrated with a battery of vehicle system 12 and configured to provide measurement and/or sensor functions for the battery (e.g., for the battery management system using an internal connection) and also provide measurements for other devices (e.g., collector device 14) such as via an auxiliary port/connection. In some embodiments, collector device 14 can be integrated with a battery and configured to communicate directly with a communication system. The communication system may include one or more vehicle communication systems, e.g., the vehicle's Wi-Fi and/or cellular systems.

Hardware 36 includes processing circuitry 42. The processing circuitry 42 may include a processor 44 and a memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) the memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 46 may be configured as a storage device.

Collector device 14 further includes software 48 stored internally in, for example, memory 46. The software 48 may be executable by the processing circuitry 42.

The processing circuitry 42 may be configured to control any of methods and/or processes described herein and/or to cause such methods, and/or processes to be performed, e.g., by collector device 14. Processor 44 corresponds to one or more processors 44 for performing collector device 14 functions described herein. In some embodiments, the software 48 may include instructions that, when executed by the processor 44 and/or processing circuitry 42, causes the processor 44 and/or processing circuitry 42 to perform the processes described herein with respect to collector device 14. For example, processing circuitry 42 of the collector device 14 may include collector unit 22 which is configured to perform any step and/or task and/or process and/or method and/or feature described in the present disclosure, e.g., perform battery data collection (e.g., measurement data collection) and cause transmission by vehicle system 12 on network 20.

System 10 includes health node 18 that includes hardware 50 that may include one or more communication interfaces 52 for communicating with vehicle system 12 and/or collector device via one or more communication links 70, 72, 74. Any of the communication links 70, 72, 74 may be configured to perform communication functions using at least one of cloud network 17 and network 20. The hardware 50 may include processing circuitry 56. The processing circuitry 56 may include a processor 58 and a memory 60. In particular, in addition to or instead of a processor, such as a central processing unit, and memory, the processing circuitry 56 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 58 may be configured to access (e.g., write to and/or read from) the memory 60, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Further, memory 60 may be configured as a storage device.

Health node 18 further has software 57 stored internally in, for example, memory 60, or stored in external memory (e.g., database, storage array, network storage device, etc.) accessible by the Health node 18 via an external connection. The software 57 may be executable by the processing circuitry 56.

The processing circuitry 56 may be configured to control any of methods and/or processes described herein and/or to cause such methods, and/or processes to be performed, e.g., by health node 18. Processor 58 corresponds to one or more processors 58 for performing health node 18 functions described herein. In some embodiments, the software 57 may include instructions that, when executed by the processor 58 and/or processing circuitry 56, causes the processor 58 and/or processing circuitry 56 to perform the processes described herein with respect to health node 18. For example, processing circuitry 56 of the health node 18 may include health unit 24 which is configured to perform any step and/or task and/or process and/or method and/or feature described in the present disclosure, e.g., identify and extract battery data transmitted by vehicle system 12 to network 20 and/or to the cloud network, and analyze the battery data in conjunctions with other data such as weather data associated the vehicle system 12 location to perform assessment and prediction of battery health. Thus, in some embodiments, health node 18 may be located at the battery manufacturer's facility or a third-party facility.

In some embodiments, communication links 70, 72, 74 may be used to perform any step and/or task and/or process and/or method and/or feature described in the present disclosure. In one nonlimiting example, at least one of communication interfaces 27, 38, 52 may be configured to initiate and/or maintain and/or terminate communication between components of system 10. For example, collector device 14, such as via communication interface 38, may be configured to communicate with health node 18 (e.g., communication interface 52) via a communication link 70 (e.g., a first communication link). Further, collector device 14 may be configured to communicate with vehicle system 12 and/or health node 18 via communication links 72, 74. At least one of communication links 72, 74 may be referred to as a second communication link. Any other combination of communication links 70, 72, 74 (and/or any other communication links) may be used. Further, one or more communication links 70, 72, 74 may be associated with and/or correspond to cloud network 17 and/or network 20 and/or any other network. Any of the networks described herein may refer to a manufacturer's network (e.g., a network maintained and/or operated and/or owned and/or used by a manufacturer such as a manufacturer of a battery). The manufacturer's network may also refer to a network associated with the battery such as a network of a battery service provider.

In one embodiment, at least one of communication links 70, 72, 74 may use and/or be associated with a communication protocol. Communication protocols may include, without being limited to, Controller Area Network (CAN), WiFi, Bluetooth, cellular communication protocols, etc.

In some other embodiments, cloud network 17 and/or network 20 and/or communication links 70, 72, 74 and/or vehicle system may be restrictive and/or permissive (e.g., restricting/permitting at least one communication/access function).

Figure 2:
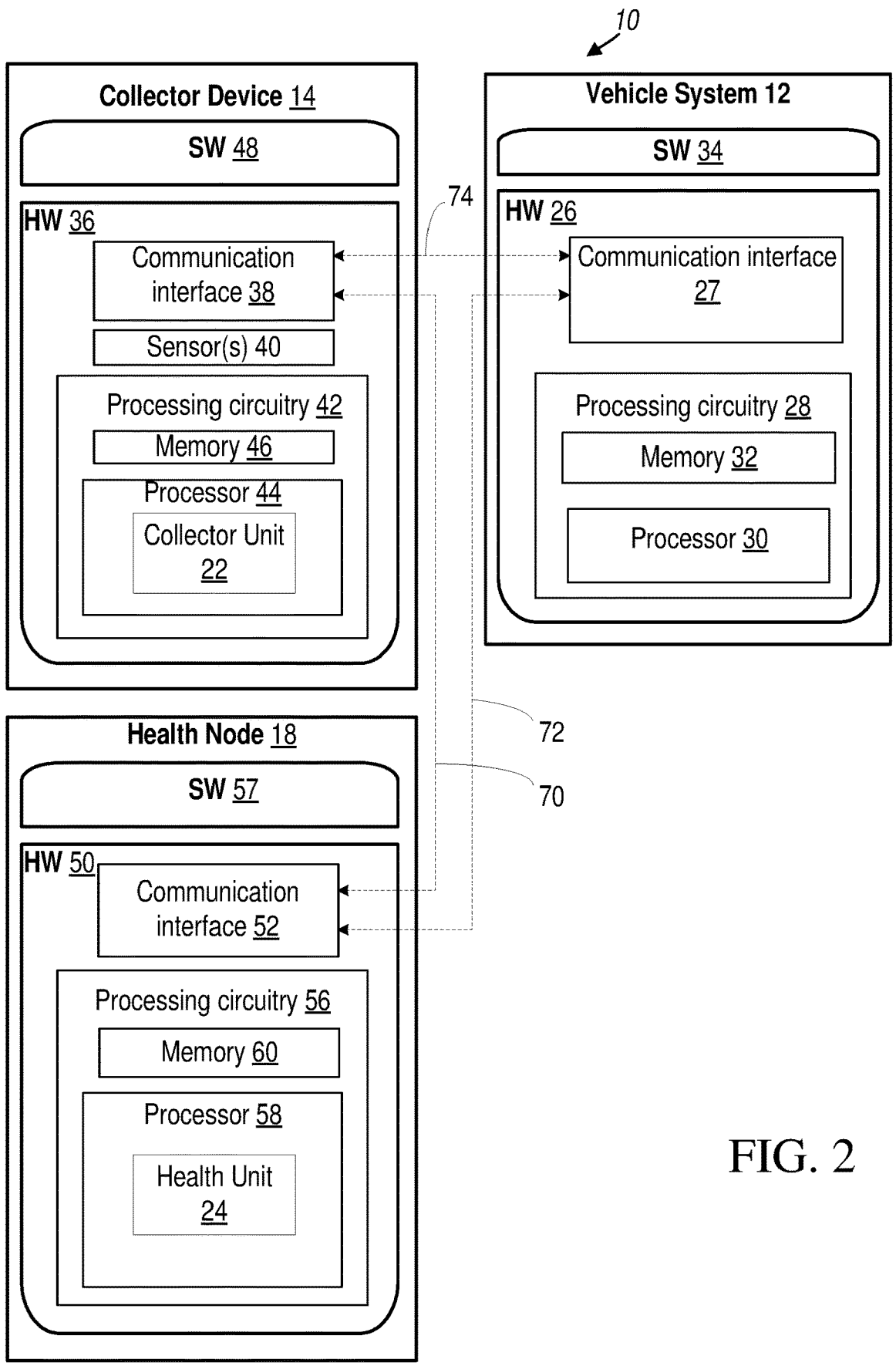
FIG. 2 is a block diagram of some entities in the system according to some embodiments of the present disclosure.

Although FIGS. 1 and 2 show various "units" such as collector unit 22 and health unit 24 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
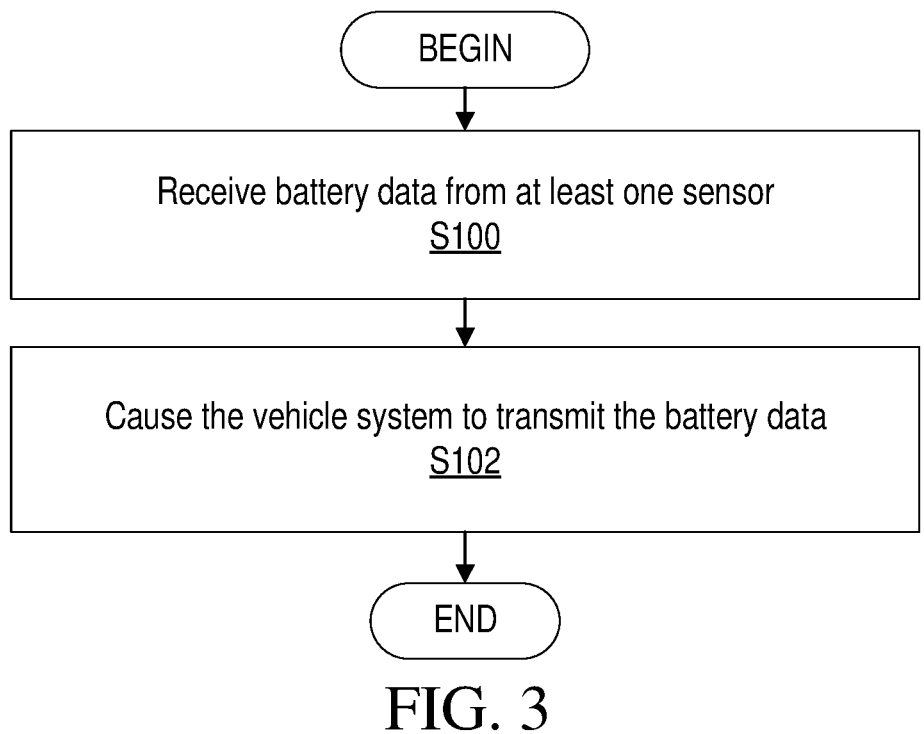
FIG. 3 is a flowchart of an example process in a collector device according to some embodiments of the present disclosure.

FIG. 3 is a flowchart of an example process in a collector device 14 according to one or more embodiments of the invention. One or more blocks described herein may be performed by one or more elements collector device 14 such as by one or more of processing circuitry 42 (including the collector unit 22) and/or processor 44. Collector device 14 is configured to receive (Block S100) battery data from at least one sensor (e.g. add-on or after-market sensor). Collector device 14 is configured to cause (Block S102) the vehicle system 12 to transmit the battery data. For example, collector device 14 may modify the format of the data and/or data packet, e.g., to "trick" the vehicle system 12 into transmitting the data via network 20 such as to the cloud network 17 and/or health node 18. That is, vehicle system 12 may be restrictive such that add-on devices that are able to connect to vehicle system 12 may otherwise have limited access the vehicle system 12 and/or to network 20 via vehicle system 12 and/or communication links 70, 72, 74, as these vehicle systems 12 are typically proprietary such that a manufacturer may only allow limited access.

However, collector device 14 may be configured to modify at least one parameter associated with vehicle system 12, communication link 70, 72, 74, cloud network 17, and/or network 20, e.g., to communicate with any device of system 10 such as health node 18 to transmit the battery data to the health node 18. Modification of at least one parameter may include adding, modifying, removing information and/or packets and/or data and/or fields and/or communication protocols (e.g., fields of a communication protocol). In one nonlimiting example, collector device 14 is advantageously able to cause vehicle system 12 to transmit battery data from sensor(s) 40 by re-formatting the data and/or packet that includes the data such that vehicle system 12 interprets the reformatted data and/or packet as a format that is preconfigured to be transmitted by vehicle system 12. This lowers the connection cost for transmitting battery data as collector device 14 is not required to have separate network 20 access, which can be costly in terms of price. For example, in some embodiments, collector device 14 can piggyback off vehicle system 12's cellular, e.g., 5G/LTE access instead of having to have a separately configured cellular wireless connection which may then result in requiring collector device 14 to have one or more cellular radios.

In one or more embodiments, collector device 14 is configured to cause transmission of the battery data to a wireless device associated with a user, e.g., operator, passenger, etc., of vehicle system 12, such as via a CAN, Bluetooth, WiFi or other wireless communication protocol, where the user's wireless device is configured to then transmit the data to cloud network via network 20. Further, sensor 40 (e.g., separate from the vehicle manufacturer's configured sensors) may be needed for data collection as the manufacturer may not allow access to certain battery data collected by preconfigured vehicle manufacturer sensors. The data transmitted to the cloud network 17 and/or health node 18 may include certain identification information that causes the data to be extracted from the transmitted vehicle data and routed to the battery manufacturer's network or other 3$^{rd}$ party network for analysis. In another embodiment, data transmitted to the cloud network 17 may include certain identification information that causes the battery data to be routed to the battery manufacturer's network and/or health node 18 or other 3$^{rd}$ party network for analysis.

Figure 4:
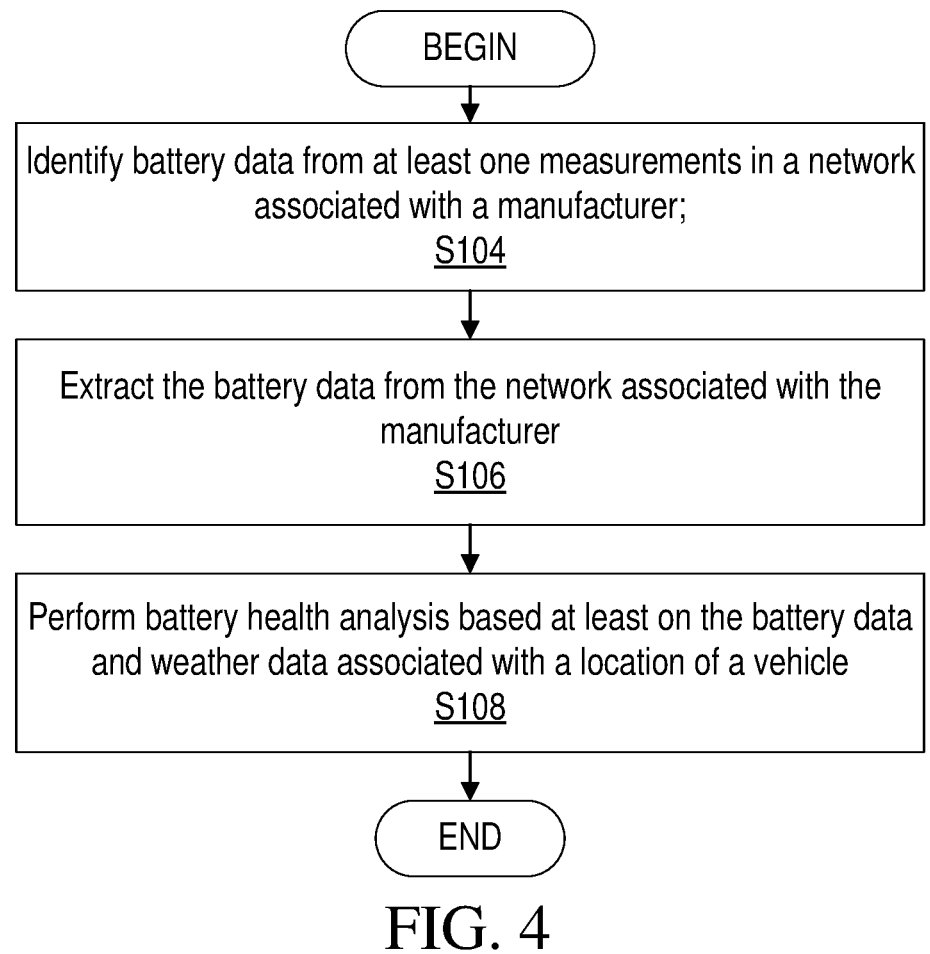
FIG. 4 is a flowchart of an example process in a health node according to some embodiments of the present disclosure.

FIG. 4 is a flowchart of an example process in health node 18 according to one or more embodiments of the invention. One or more blocks described herein may be performed by one or more elements of health node 18 such as by one or more of processing circuitry 56 (including the health unit 24) and/or processor 58. Health node 18 is configured to identify (Block S104) battery data from at least one measurements in a network associated with a manufacturer. Health node 18 is configured to extract (Block S106) the battery data from the network associated with the vehicle manufacturer. Health node 18 is configured to perform (Block S108) battery health analysis based at least on the battery data and weather data associated with a location of a vehicle. For example, the battery data may be identified based on the format of the battery.

Figure 5:
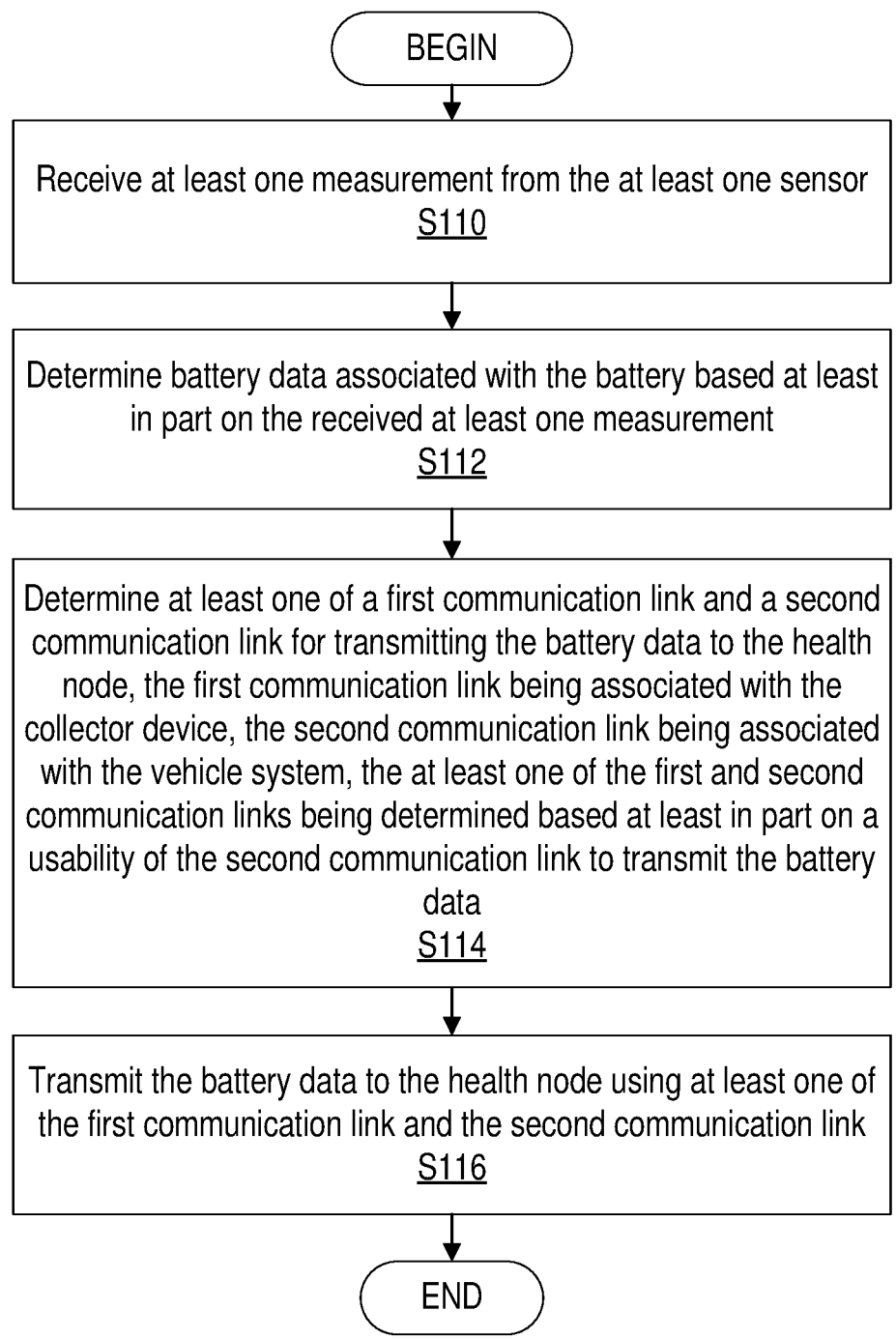
FIG. 5 is a flowchart of another example process in a collector device according to some embodiments of the present disclosure.

FIG. 5 a flowchart of another example process in a collector device 14 according to one or more embodiments of the invention. One or more blocks described herein may be performed by one or more elements collector device 14 such as by one or more of processing circuitry 42 (including the collector unit 22) and/or processor 44. Collector device 14 is configured to receive (Block S110) at least one measurement from the at least one sensor 40; determine (Block S112) battery data associated with the battery based at least in part on the received at least one measurement; determine (Block S114) at least one of a first communication link 70 and a second communication link 72, 74 for transmitting the battery data to the health node, where the first communication link 70 is associated with the collector device 14, the second communication link 72, 74 is associated with the vehicle system 12, the at least one of the first and second communication links 70, 72, 74 are determined based at least in part on a usability of the second communication link 72, 74 to transmit the battery data; and transmit (Block S116) the battery data to the health node 18 using at least one of the first communication link 70 and the second communication link 72, 74.

In some embodiments, the at least one sensor 40 is connected to the battery to provide the at least one measurement, and the at least one sensor 40 is any one of: external to at least one of the battery and the collector device 14; included in the battery; and included in the collector device 14.

In some other embodiments, the at least one sensor 40 is a hybrid sensor being configured to provide the at least one measurement usable by the collector device 14 and another measurement usable by the battery.

In an embodiment, the first communication link 70 is associated with a first network 40a, and the second communication link 72, 74 is associated with a second network 40b. The second network 40b is any one of restrictive and permissive for the collector device 14 to communicate with the health node 18 using the second communication link 72, 74 and the second network 40b.

In another embodiment, the method further includes determining the usability of the second communication link 72, 74 based on whether the second network 40b is any one of restrictive and permissive.

In some embodiments, the method further includes, when the second network 40b is restrictive, modifying at least one parameter associated with the second communication link 72, 74 at least to transmit the battery data to the health node 18 using the second communication link 72, 74 and the modified at least one parameter.

In some other embodiments, the second network 40b is restrictive when the vehicle system 12 limits at least a set of the battery data to be transmitted using the second network 40b.

In an embodiment, the determined battery data includes an identifier that causes the battery data to be routed through the second network 40b when the battery data is transmitted.

In another embodiment, the method further includes receiving battery health information from the health node 18 using at least one of the first and second communication links 70, 72, 74. The battery health information is based on the transmitted battery data.

In some embodiments, the collector device is configured to communicate with the vehicle system 12 using an onboard diagnostic interface comprised in the vehicle system 12.

Figure 6:
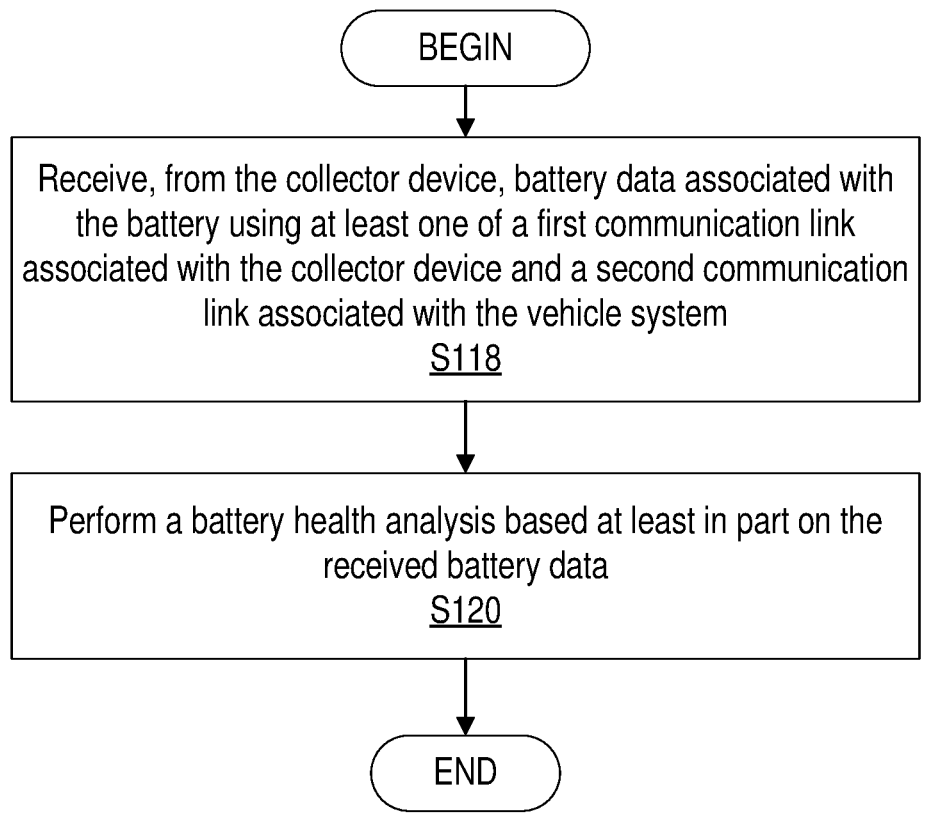
FIG. 6 is a flowchart of another example process in a health node according to some embodiments of the present disclosure.

FIG. 6 a flowchart of another example process in health node 18 according to one or more embodiments of the invention. One or more blocks described herein may be performed by one or more elements of health node 18 such as by one or more of processing circuitry 56 (including the health unit 24) and/or processor 58. Health node 18 is configured to receive (Block S118) from the collector device 14, battery data associated with the battery using at least one of a first communication link 70 associated with the collector device 14 and a second communication link 72, 74 associated with the vehicle system 12; and perform a battery health analysis based at least in part on the received battery data.

In some embodiments, the first communication link 70 is further associated with a first network 40*a*, and the second communication link 72, 74 is further associated with a second network 40*b*, the second network being any one of restrictive and permissive for health node 18 to communicate with the collector device 14 using the second communication link 72, 74 and the second network 40*b*.

In some other embodiments, the method further includes performing at least one measurement in at least one of the first network 40*a* and the second network 40*b* and identifying the battery data from the at least one measurement.

In an embodiment, the method further includes extracting the battery data from at least one of the first network 40*a* and the second network 40*b*.

In another embodiment, the battery health analysis is performed further based on weather data associated with a location of at least one of the collector device 14 and the vehicle system 12.

In some embodiments, the method further includes transmitting, using at least one of the first communication link 70*a* and the second communication link 72,74, battery health information based on the performed battery health analysis.

In one nonlimiting example, a user of vehicle system 12 may connect (e.g., couple, plug in, wirelessly connect) collector device 14 (e.g., via communication interface 38) to vehicle system 12 (e.g., via communication interface 27) using communication link 74 to obtain battery health information using a sensor other than a sensor 40 of the battery. Communication link 74 may be a wired or wireless connection. Collector device 14 (e.g., dongle connected to an OBD port of a vehicle system) may receive a measurement such as battery voltage from the sensor 40 (e.g., external sensor) that is connected to at least one terminal of a battery of a vehicle associated with vehicle system 12. Using a sensor 40 allows to perform measurement(s) that otherwise would not be available to an add-on device.

Collector device 14 may determine battery data from the measurement and further determine how to transmit the battery data to a health node 18, e.g., by determining whether to use a first communication link 70 (e.g., direct) and/or a second communication link 72, 74 (e.g., indirect). However, communication link 72, 74 (and/or associated network 20) may be access restricted, where the manufacturer (or service provider) of the battery may not grant access to devices other than the battery systems and/or vehicle system 12. Collector device 14 may be configured to determine whether to use the second communication link 72, 74, e.g., by modifying the second communication link 72, 74. A modification may include modifying a packet of the battery data and/or of a protocol associated with the second communication link 72, 74 and/or corresponding network 20. Further, collector device 14 may transmit battery data using the first communication link 70 (e.g., unrestricted, permissive) and/or the second communication link 72, 74 (e.g., restrictive). A subset of the battery data may be transmitted using the first communication link 70, and another subset of the battery data may be transmitted using the second communication link 72, 74.

Health node 18 may receive the transmitted battery data (e.g., via at least one of the first and second communication links 70, 72, 74) and/or perform a battery health analysis, which can be transmitted to collector device 14 via any of the communication links 70, 72, 74. The user may obtain the battery health information from the collector device 14 and/or health node 18 and/or vehicle system 12.

In other words, the embodiments described herein are beneficial at least because battery health information and/or battery data may be obtained, where the battery health information and/or battery data would otherwise would be restricted or not available to a user such as in the case of add-on or after-market components that have little to no access to vehicle parameters (e.g., battery data, battery health information) and/or to the wireless communication system(s) of a vehicle.

It is also noted that, although embodiments herein are described with reference to battery data and/or battery health information associated with a vehicle system, embodiments are not limited solely to the capture and transmission of battery data and/or battery health information and/or the battery being part of a vehicle system. It is contemplated that the arrangements and methods described herein can be applied to other systems/components/data that are not necessarily part of the vehicle as manufactured by the vehicle manufacturer. For example, the concepts and principles described herein can be applied to "after-market" products, modifications, and the like, that may or not to be installed on the vehicle (e.g., installed on and/or connected to a battery bank of a hospital, industrial facility, test facility, etc.)

The following is a list of nonlimiting example embodiments:

Embodiment A1. A collector device comprising:
processing circuitry configured to:
receive battery data from at least one sensor; and
cause a vehicle system to transmit the battery data.

Embodiment B1. A health node comprising:
processing circuitry configured to:
identify battery data from at least one measurement in a network associated with a vehicle manufacturer;
extract the battery data from the network associated with the vehicle manufacturer; and
perform battery health analysis based at least on the battery data and weather data associated with a location of a vehicle.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer software, or program code, for carrying out operations of the concepts described herein may be written in an object-oriented programming language such as Python, Java® or C++. However, the computer software for carrying out operations of the disclosure may also be written in conventional procedural programming languages, such as the "C" programming language.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A collector device configured to communicate with a vehicle system associated with a battery, a health node and at least one sensor, the collector device comprising:
   a communication interface configured to:
      receive at least one measurement from the at least one sensor; and
      transmit battery data associated with the battery to the health node using at least one of a first communication link and a second communication link;
   processing circuitry in communication with the communication interface, the processing circuitry being configured to:
      determine the battery data based at least in part on the received at least one measurement; and
      determine at least one of the first communication link and the second communication link for transmitting the battery data to the health node, the first communication link being associated with the collector device, the second communication link being associated with the vehicle system, the at least one of the first and second communication links being determined based at least in part on a usability of the second communication link to transmit the battery data, the usability of the second communication link being based on whether the second communication link is any one of restrictive and permissive to transmit the battery data.

2. The collector device of claim 1, wherein the at least one sensor is connected to the battery to provide the at least one measurement, and the at least one sensor is any one of:
   external to at least one of the battery and the collector device;
   included in the battery; and
   included in the collector device.

3. The collector device of claim 1, wherein the at least one sensor is a hybrid sensor being configured to provide the at least one measurement usable by the collector device and another measurement usable by the battery.

4. The collector device of claim 1, wherein the first communication link is associated with a first network, and the second communication link is associated with a second network, the second network being any one of restrictive and permissive for the collector device to communicate with the health node using the second communication link and the second network.

5. The collector device of claim 4, wherein the processing circuitry is further configured to:
   determine the usability of the second communication link further based on whether the second network is any one of restrictive and permissive.

6. The collector device of claim 4, wherein the processing circuitry is further configured to:
   when the second network is restrictive, modify at least one parameter associated with the second communication link at least to transmit the battery data to the health node using the second communication link and the modified at least one parameter.

7. The collector device of claim 4, wherein the second network is restrictive when the vehicle system limits at least a set of the battery data to be transmitted using the second network.

8. The collector device of claim 4, wherein the determined battery data includes an identifier that causes the battery data to be routed through the second network when the battery data is transmitted.

9. The collector device of claim 1, wherein the communication interface is further configured to:
   receive battery health information from the health node using at least one of the first and second communication links, the battery health information being based on the transmitted battery data.

10. The collector device of claim 1, wherein the collector device is configured to communicate with the vehicle system using an onboard diagnostic interface comprised in the vehicle system.

11. A method in a collector device configured to communicate with a vehicle system associated with a battery, a health node and at least one sensor, the method comprising:
receiving at least one measurement from the at least one sensor;
determining battery data associated with the battery based at least in part on the received at least one measurement;
determining at least one of a first communication link and a second communication link for transmitting the battery data to the health node, the first communication link being associated with the collector device, the second communication link being associated with the vehicle system, the at least one of the first and second communication links being determined based at least in part on a usability of the second communication link to transmit the battery data, the usability of the second communication link being based on whether the second communication link is any one of restrictive and permissive to transmit the battery data; and
transmitting the battery data to the health node using at least one of the first communication link and the second communication link.

12. The method of claim 11, wherein the at least one sensor is connected to the battery to provide the at least one measurement, and the at least one sensor is any one of:
external to at least one of the battery and the collector device;
included in the battery; and
included in the collector device.

13. The method of claim 11, wherein the at least one sensor is a hybrid sensor being configured to provide the at least one measurement usable by the collector device and another measurement usable by the battery.

14. The method of claim 11, wherein the first communication link is associated with a first network, and the second communication link is associated with a second network, the second network being any one of restrictive and permissive for the collector device to communicate with the health node using the second communication link and the second network.

15. The method of claim 14, wherein the method further includes:
determining the usability of the second communication link further based on whether the second network is any one of restrictive and permissive.

16. The method of claim 14, wherein the method further includes:
when the second network is restrictive, modifying at least one parameter associated with the second communication link at least to transmit the battery data to the health node using the second communication link and the modified at least one parameter.

17. The method of claim 14, wherein the second network is restrictive when the vehicle system limits at least a set of the battery data to be transmitted using the second network.

18. The method of claim 14, wherein the determined battery data includes an identifier that causes the battery data to be routed through the second network when the battery data is transmitted.

19. The method of claim 11, wherein the method further includes:
receiving battery health information from the health node using at least one of the first and second communication links, the battery health information being based on the transmitted battery data.

20. A system, the system comprising a collector device, a vehicle system, and a health node:
the collector device comprising:
a first communication interface configured to:
receive at least one measurement from at least one sensor; and
transmit battery data associated with a battery to the health node using at least one of a first communication link and a second communication link;
first processing circuitry in communication with the first communication interface, the first processing circuitry being configured to:
determine the battery data based at least in part on the received at least one measurement; and
determine at least one of the first communication link and the second communication link for transmitting the battery data to the health node, the first communication link being associated with the collector device, the second communication link being associated with the vehicle system, the at least one of the first and second communication links being determined based at least in part on a usability of the second communication link to transmit the battery data, the usability of the second communication link being based on whether the second communication link is any one of restrictive and permissive to transmit the battery data;
the vehicle system comprising:
a second communication interface configured to:
receive the battery data, from the collector device, using the second communication link; and
transmit the battery data, to the health node, using the second communication link;
receive battery health information, from the health node, using the second communication link;
transmit the battery health information, to the collector device, using the second communication link;
the health node comprising:
a third communication interface configured to:
transmit, using at least one of the first communication link and the second communication link, the battery health information based on a battery health analysis.

* * * * *